United States Patent [19]

Intrater et al.

[11] Patent Number: 5,446,909
[45] Date of Patent: Aug. 29, 1995

[54] BINARY MULTIPLICATION IMPLEMENTED BY EXISTING HARDWARE WITH MINOR MODIFICATIONS TO SEQUENTIALLY DESIGNATE BITS OF THE OPERAND

[75] Inventors: Gideon Intrater, Ramat-Gan; Ohad Falik, Petach-Tivka; Aharon Ostrer, Hertzelia; Yair Baydatch, Ramat-Hasaron; Gadi Erlich, Kfar-Haim, all of Israel

[73] Assignee: National Semiconductor Corporation, Santa Clara, Calif.

[21] Appl. No.: 989,219

[22] Filed: Dec. 11, 1992

[51] Int. Cl.⁶ ............................ G06F 7/50; G06F 7/52
[52] U.S. Cl. ..................................... 395/800; 395/375; 364/754; 364/758; 364/759; 364/258.2; 364/259.5; 364/259.8; 364/DIG. 1
[58] Field of Search ................ 395/800; 364/375, 746, 364/748, 754, 758, 759, 760

[56] References Cited

U.S. PATENT DOCUMENTS

| | | | |
|---|---|---|---|
| 3,617,723 | 11/1971 | Melvin | 364/759 |
| 4,228,518 | 10/1980 | Chamberlin | 364/759 |
| 4,346,451 | 8/1982 | Katayama | 364/746 |
| 4,658,094 | 4/1987 | Clark | 380/28 |
| 4,807,175 | 2/1989 | Tokumaru et al. | 364/760 |
| 4,878,191 | 10/1989 | Oguchi | 364/759 |
| 4,970,676 | 11/1990 | Fling | 364/759 |
| 5,025,408 | 6/1991 | Sherman | 364/759 |
| 5,031,137 | 7/1991 | Elrod | 364/757 |
| 5,150,321 | 9/1992 | Keating | 364/759 |
| 5,184,318 | 2/1993 | Brigg et al. | 364/754 |
| 5,193,070 | 3/1993 | Abiko et al. | 364/724.16 |
| 5,218,564 | 6/1993 | Covey | 364/750.5 |
| 5,220,525 | 6/1993 | Anderson et al. | 364/760 |
| 5,289,400 | 2/1994 | Przybysz et al. | 364/759 |

FOREIGN PATENT DOCUMENTS 2230122 10/1990 United Kingdom .

OTHER PUBLICATIONS

Dean, K. J. 'Some Electronic Logic Circuits for Serial-Parallel Arithemetic, Radio and Electronic Engineer', vol. 37, No. 2, Feb. 1969, London GB pp. 95–98.

Derwent Publications Ltd., London, GB, Soviet Inventions Illustrated, Section EI, Week 8747, Class T, AN 87 333693.

Moore, J. W. 'Associative Control Store System for Multiplication', IBM Technical Disclosure Bulletin, vol. 19, No. 2, Jul. 1976, New York US pp. 612–613.

Waldecker, D. E. "Increased Utilization Counter", IBM Technical Disclosure Bulletin, vol. 15, No. 2, Jul. 1972, New York US p. 571.

*Primary Examiner*—Alyssa H. Bowler
*Assistant Examiner*—Meng-Ai T. An
*Attorney, Agent, or Firm*—Frishauf, Holtz, Goodman & Woodward

[57] ABSTRACT

Binary multiplication is performed with existing data processing apparatus to which only minor modifications are required. One operand and a partial product are stored in existing latches of a CPU. The second operand is stored in a shift register which is added to the CPU. The data in the shift register is shifted from the LSB to the MSB, with a "0" being loaded into the LSB. As the bits in the first operand are designated in sequence, the value of the partial product is increased by the value in the shift register if the designated bit is a "1". After the sequencing has designated all the bits of the first operand, the partial product is taken to be the product of the multiplication.

6 Claims, 4 Drawing Sheets

BINARY MULTIPLICATION IMPLEMENTED BY EXISTING HARDWARE WITH MINOR MODIFICATIONS TO SEQUENTIALLY DESIGNATE BITS OF THE OPERAND

BACKGROUND OF THE INVENTION

The present invention relates to a data processing technique for performing integer multiplication and, in particular, to a method and apparatus for supporting binary multiplication by an existing data processing apparatus, with only minor modifications thereto being required.

Central processor units ("CPUs") are normally provided with the capability to perform a multiplication instruction because multiplication is such a frequently required operation in data processing. A representative example of such multiplication instructions is referred to below as "MULi", and it can be performed by the 32000/EP family of CPU's available from National Semiconductor Corporation ("NSC").

The MULi instruction multiplies two n-bit signal (2's complement) or unsigned integer operands, where n=8, 16 or 32, and returns an n-bit result. The MULi instruction does not activate a trap if the result is too big to be represented using an n-bit number.

Existing CPUs which support the MULi instruction use either a dedicated array multiplier or a shift-and-add algorithm. CPU's which employ a dedicated array multiplier achieve high performance by manipulating both operands with a matrix of $n^2$ (n is the number of bits) elements to execute the multiplication in a few cycles (usually one or two). A lower cost, and reduced performance, solution utilizes the shift-and-add algorithm. The execution time is proportional to n (usually $1*n+k$ or $2*n+k$, where k is a small constant). The common MULi shift-and-add multiplication algorithm for binary numbers is described below with reference to FIGS. 1 and 2.

As shown in FIG. 1, storage register, or latch, 3 and shift register 5 are provided for storing operands A and B, respectively. Shift register 7 is provided for storing partial product P. AND gates 9 and arithmetic logic unit ("ALU") 11 complete the needed hardware. The single gate shown in FIG. 1 for AND gates 9 is a representation used for the sake of convenience. In actuality, an array of n AND gates is used, with n being the number of bits in operand A. Each of these gates receives on one of its two inputs a corresponding bit of operand A. On its other input the respective gates all receive the same control bit, namely the least significant bit ("LSB") of register 5. Thus, AND gates 9 together receive all the bits of operand A in latch 3 in parallel. AND gates 9 have n output lines which will carry the n-bits of latch 3 when the LSB of register 5 is a "1" and otherwise such output lines carry a "0" ALU 11 has n inputs for the above-described n outputs of AND gates 9, and it also receives the partial product P from register 7 on a further set of n inputs.

The operation of the hardware shown in FIG. 1 proceeds in accordance with the flow chart of FIG. 2. In step 21, latch 7 is initialized to zero, and operands A and B are loaded into latch 3 and register 5, respectively. If step 23 determines that the LSB of register 5 is "1", the AND gates 9 open to put the contents A of latch 3 at the input of ALU 11 and, per step 25, ALU 11 adds P of register 7 to A of latch 3. The result is placed back into register 7 per step 27, and thus constitutes the new value of P. If, however, the LSB of register 5 is "0", AND gate 9 closes and a "0" is placed on its output to ALU 11. This value of "0" is added, per step 26, to P. Thus, steps 26 and 27 produce no change in the value of P in register 7.

After step 27 is performed, step 29 shifts the contents of registers 5 and 7 to the right, i.e. toward the LSB, by one bit. Also, since the LSB of register 7 is connected to the most significant bit ("MSB") of register 5, as part of this step a zero is shifted to the MSB of register 7, and the LSB of register 7 is shifted into the MSB of register 5. The LSB of register 5 is shifted out and dropped.

After the occurrence of n sequences of steps 23, 25 or 26, 27 and 29, as determined by step 31, the product of the multiplication is stored in registers 5 and 7. The content B of register 5 is taken as the value of the product. The data P in register 7 can be disregarded. The fact that only the data B of register 5 is relied upon by MULi is used to advantage in the invention described below.

The above-described implementation utilizes the following hardware: ALU 11, AND gates 9, shift registers 5 and 7, and latch 3. For most CPU configurations, the list of hardware elements requires the addition of two shift registers, while the ALU and latch are available as part of the existing hardware thereof.

SUMMARY OF THE INVENTION

One object of the invention is to implement a binary multiplication of integers by existing hardware of an available CPU with only minor modifications thereto being required.

This and other objects are attained in accordance with one aspect of the invention directed to a binary multiplier having a first means for storing an operand and a shift register stores another operand. A second means is provided for storing a partial product derived as follows. A sequencing means sequentially designates bits of the operand in the first storing means. The partial product is updated by means synchronized with the sequencing means and with shifting of the operand stored in the shift register in response to each designated bit so that, when such bit has one value, the partial product is increased by the contents of the shift register and, when such bit has another value, the partial product remains unchanged. After the sequencing means has sequenced through the bits of the operand in the first storing means, the product of multiplying one operand by the other resides in the second storing means.

Another aspect of the invention is directed to a method for binary multiplication including the following steps. The first and second operands are stored, as is the partial product thereof. Bits of the first operand are sequentially designated from the LSB to the MSB. The second operand is repeatedly shifted to the left from the LSB, and the MSB is discarded. The partial product is updated, in synchronism with the shifting and designation steps, so that, when the designated bit has one value, the partial product is increased by the shifted second operand and, when the designated bit has another value, the partial product remains unchanged. After all the bits of the first operand have been sequentially designated, the partial product is taken to be the product of multiplying the first and second operands.

One further aspect of the invention is directed to a binary multiplier for integers that accepts two n-bit operands to provide an n-bit product after completion of n operational steps, including an adder for adding two n-bit integer operands to produce a partial product. A means designates a bit from the n-bits of one of the operands for each of the operational steps. A first means stores the partial product. A second means stores the other one of the operands and, in each of the operational steps, shifts such operand one bit to the left while loading a "0" in the least significant bit and discarding the most significant bit. The adder has its inputs coupled to outputs of the first means and the second means. A control means carries out each of the n operational steps by actuating the designating means to shift from the LSB to the MSB in one-bit increments, and adds the partial product to the contents of the second storing means if the designated bit has a predetermined value. The adder, first storing means and second storing means are designed to handle only n bits for each of the n operational steps.

Yet another aspect of the invention is directed to a method of multiplying integers that accepts two n-bit operands to provide an n-bit product after completion of n operational steps, including the following steps. Two n-bit integer operands are added to produce a partial product. A bit from the n-bits of one of the operands is designated for each of the n operational steps. The partial product is stored. The other one of the operands is stored and, in each of the operational steps, such operand is shifted one bit to the left while a "0" is loaded in the LSB and the MSB is discarded. Each of the n operational steps is controlled by actuating the designating means to shift from the LSB to the MSB in a one bit increment, and the partial product is added to the shifted other operand if the designated bit has a predetermined value. The adding, storing of the partial product and storing of the other operand steps handle only n bits for each of the n operational steps.

DETAILED DESCRIPTION OF THE INVENTION

Figure 3:
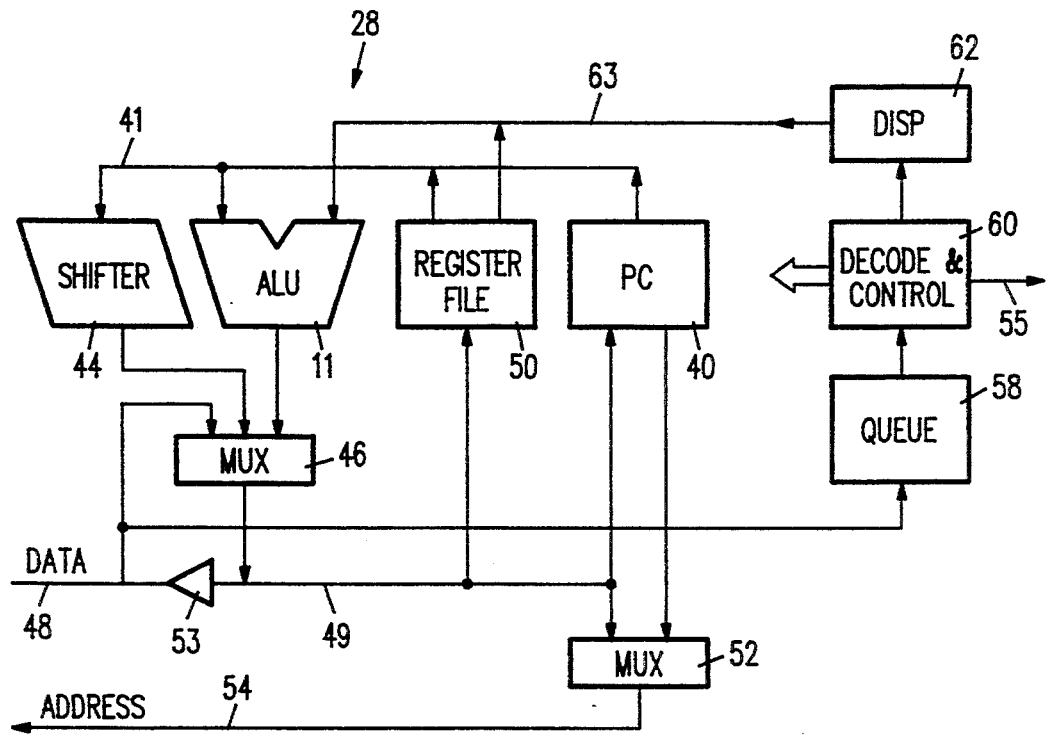
FIG. 3 is a schematic block diagram of a CPU used to carry out the invention.

A preferred embodiment of the invention will be explained by illustrating how a shift-and-add MULi is performed by a particular CPU in order to demonstrate that only minimal hardware must be dedicated to the MULi. The particular CPU referred to below is a 32-bit RISC CPU with a LOAD/STORE architecture. It supports various arithmetic and logic operations performed on 8, 16 or 32-bit operands. Details of its structure and operation are provided in U.S. Ser. No. 07/989,217, filed Dec. 11, 1992 now pending for BUS OF CPU CORE OPTIMIZED FOR ACCESSING ON-CHIP MEMORY DEVICES, the contents of which are hereby incorporated by reference. For the sake of convenience, the structure and operation of the CPU are summarized below in connection with the circuit shown in FIG. 3.

In CPU 28, program counter ("PC") 40 is a counter, or more accurately an incrementer, having its output coupled via bus 41 to arithmetic logic unit ("ALU") 11 and barrel-shifter ("BS") 44. Multiplexer ("MUX") 46 receives the outputs of ALU 11 and BS 44, and another input provided thereto is a signal on data bus 48. MUX 46 provides an output over result bus 49 to buffer 53, register file 50, PC 40 and MUX 52, with the output of the latter being coupled to address bus 54. Register file 50 provides its output on bus 41. Buffer 53 is oriented to drive outgoing signals from MUX 46 onto data bus 48. The buffer will drive data onto data bus 48 only during the appropriate time of the write cycle. Buffer 53 will be in tri-state (inactive state) the rest of the time.

Displacement circuitry ("DISP") 62 outputs data on bus 63 for use in computations in which the data is in immediate mode (part of the program stream). This is also true for displacements in memory references.

Queue 58 receives the data read from memory on bus 48 during the fetch instructions. A fetch instruction is issued by the control section of decode and control circuit 60 whenever the bus is available and the queue is not full. The decode section of circuit 60 decodes the instructions at the top of the queue, and executes them. After an instruction is decoded, it is removed from the queue to make room for the next one (i.e. a FIFO operation). The decode and control circuit 60 activates the rest of CPU 28 in accordance with the contents of the decoded instructions. For example, if the instruction is to add the contents of one register to the contents of another register, the following steps will be performed. Two registers will be read from register file 50 to the two inputs of ALU 11, respectively. The ALU then receives and executes an add command, and MUX 46 routes the ALU's resulting output back to the appropriate register in register file 50 via result bus 49.

ALU 11 performs logic (AND, OR, XOR, etc.) and arithmetic (ADD, SUBTRACT, etc.) operations on operands read from register file 50. In shift operations, the operand is read from the register file to the input of BS 44. The shift result is directed by the control circuit 60 from the output of BS 44 through MUX 46 and back to register file 50 via result bus 49.

For branch and jump instructions, the new value in PC 40 is calculated in ALU 11 which adds a displacement received from DISP 62 to the current value read from PC 40. The result is used as an address for a new fetch command through MUX 52, and it is also stored into PC 40 for future use. PC 40 is capable of incrementing its content by 2 or 4 each time an instruction is fetched from memory. This is necessary because data is fetched only as a word (i.e. 2 bytes) or a double word (i.e. 4 bytes).

LOAD and STORE instructions are used in order to read and write data to the memory. A LOAD instruction reads 1, 2 or 4 bytes from a memory (not shown). The address of the data is generated by adding in the ALU the contents of a register (read from register file 50) to a displacement value (read from DISP unit 62). The addition result passes through MUX's 46 and 52 to address bus 54. The data read from the memory is received on data bus 48 and from it, through MUX 46, it is written to register file 50. If data alignment is required, the data is then shifted through BS 44 and again written to register file 50. In STORE operations, the address generation is performed just as described above for the LOAD. The data is read from register file 50, aligned by BS 44 and written to data bus 48 through MUX 46 and buffer 53.

CPU 28 has three main parts, namely an instruction loader, an execution unit and a control logic. The instruction loader, which includes queue 58, PC 40 and MUX 52, loads instructions from the external system and provides them to the execution unit for execution. The execution unit includes register file 50, ALU 11, BS 44, DISP 62 and buffer 53. The control logic, which includes block 60, controls the instruction loader, execution unit and the interface to the CPU core. Instructions are fetched from bus 48 into instruction queue 58, are decoded by circuit 60, and then sent to the execution unit for execution. The control logic of block 60 selects which of the resources in the execution unit is used for each instruction. More specifically, on arithmetic and logic instructions, operands are read into ALU 11 or BS 44, and the result is written to a destination register in register file 50. On LOAD instructions, ALU 11 computes the effective memory address, and the source operand is written to the memory via bus 48. For branch and jump instructions, a target address is computed with ALU 11 by adding the current content of PC 40 to a displacement value in DISP 62, and the result is written into PC 40.

Figure 1:
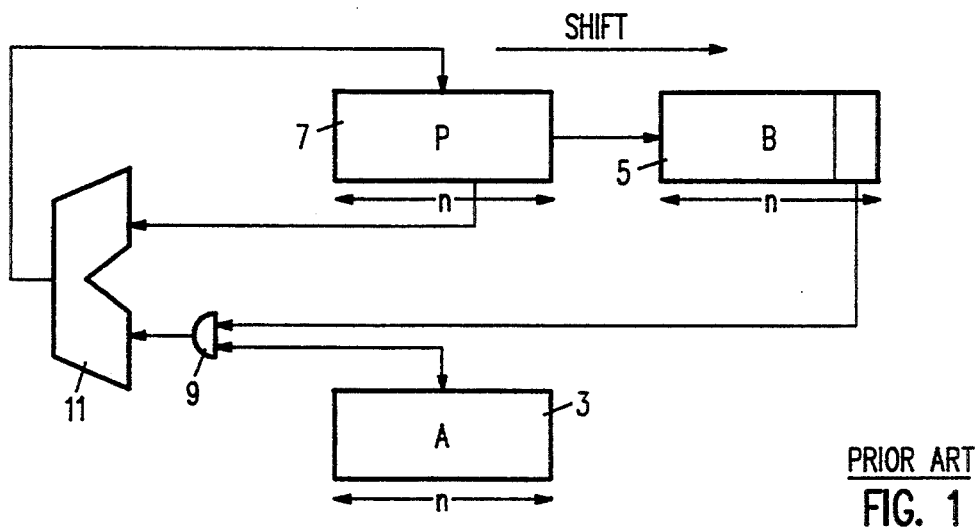
FIG. 1 is a schematic block diagram of a prior art circuit for carrying out a binary multiplication of integers.
Figure 2:
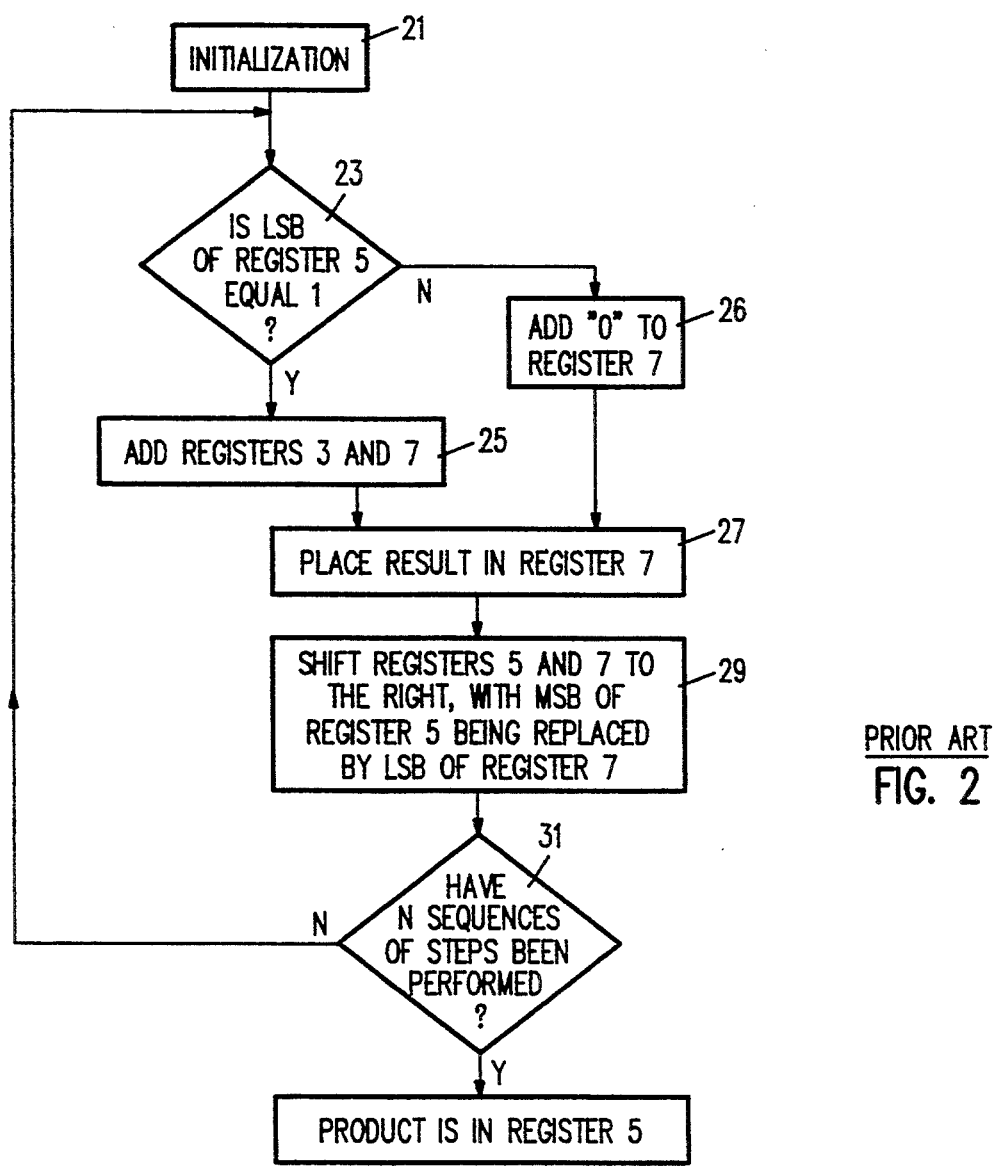
FIG. 2 is a flow chart of steps performed by the prior art circuit of FIG. 1 to execute a multiplication of two operands.
Figure 4:
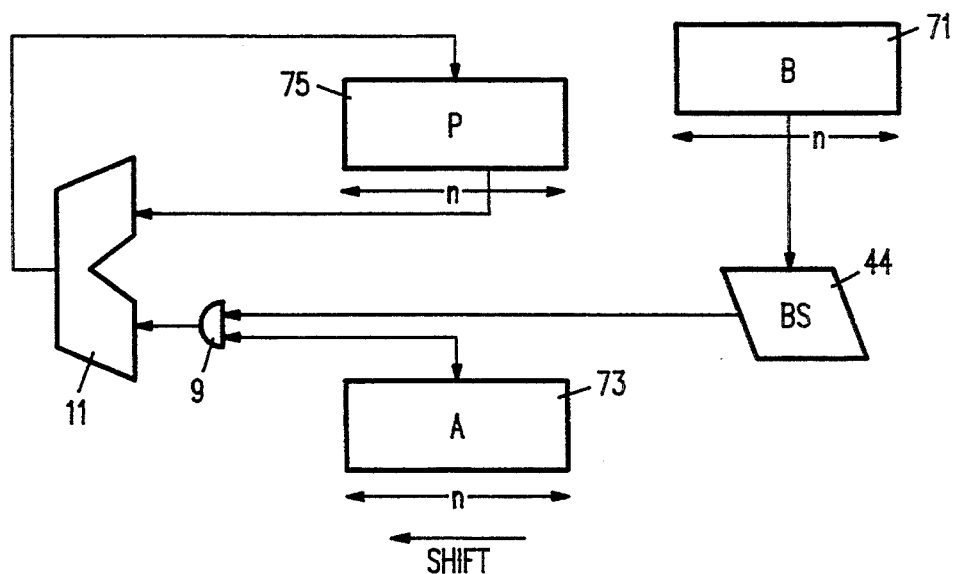
FIG. 4 is a schematic block diagram of a circuit for carrying out a binary multiplication of integers in accordance with the invention.
Figure 5:
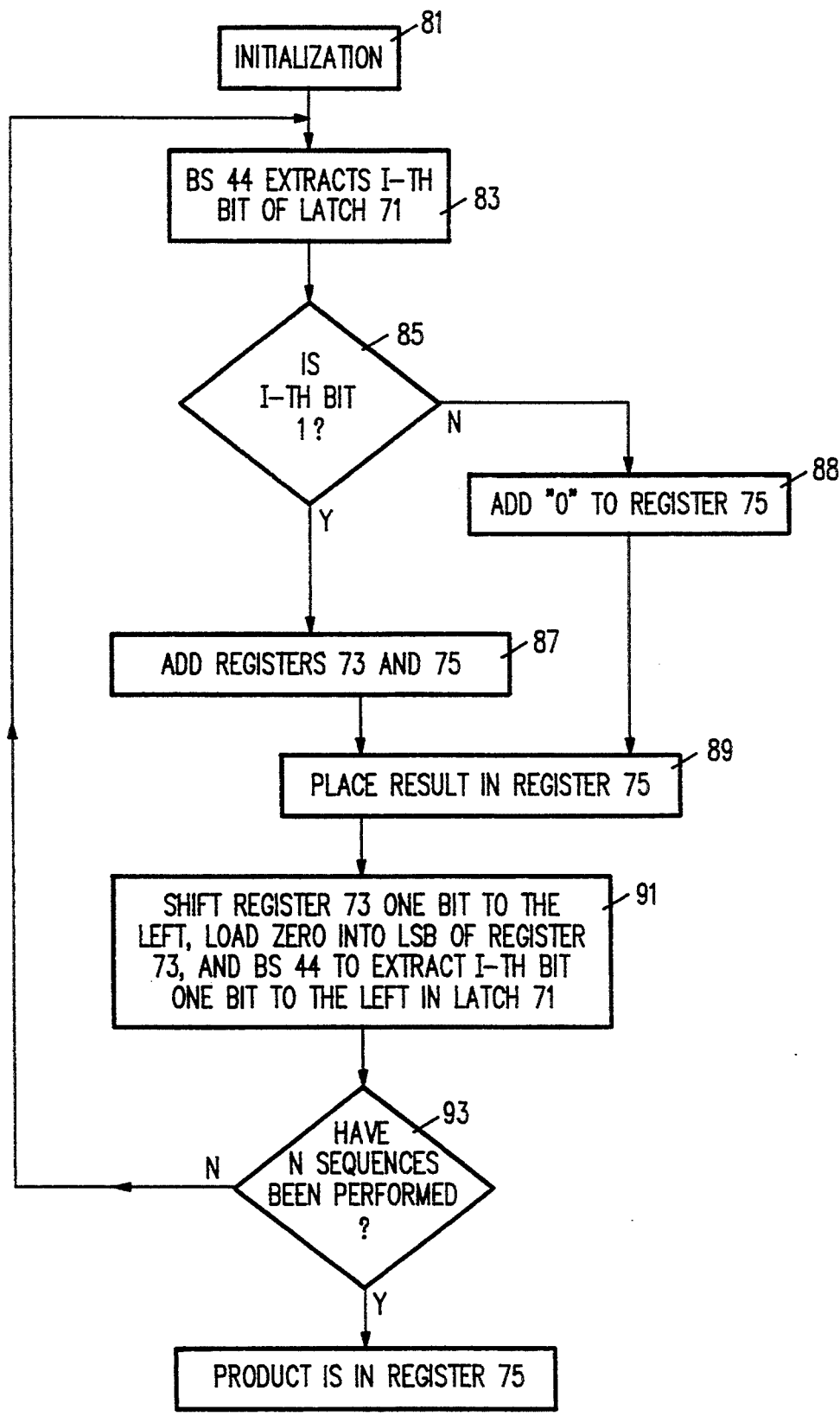
FIG. 5 is a flow chart of steps performed by the circuit of FIG. 4 to execute a multiplication of two operands in accordance with the invention.

Turning now to FIG. 4, it shows a multiplier circuit to implement the shift-and-add algorithm of the invention. ALU 11 and AND gates 9, are the same as those shown in FIG. 1. In addition to these elements, latch 71 stores operand B, shift register 73 stores operand A, and P is stored in latch 75. BS 44 of the CPU is connected between latch 71 and AND gate 9. The two operands are n-bit integers, and the product of the multiplication is an n-bit result. All the just-mentioned means have the capability of handling only n bits for each operation of the multiplication. This configuration is operated in accordance with the flow chart of FIG. 5.

In step 81 the P value stored in latch 75 is initialized to zero, while operands A and B are stored in shift register 73 and latch 71, respectively. BS 44 designates the i-th bit from latch 71, where i=1 to n. Thus, initially the LSB of latch 71 is designated and its value is extracted, as per step 83. If the value of this bit is "1" as determined by step 85, then AND gates 9 open to place the contents A of register 73 at the input to ALU 11. Step 87 adds A to the value P, and the result is stored back into latch 75 per step 89 as a new value of P. If, however, the value of the extracted i-th bit is "0", ALU 11 adds "0" to P, per step 88, and the execution of steps 88 and 89 produces no change in the contents of latch 75.

After the execution of step 89, step 91 shifts register 73 one place to the left, i.e., toward the MSB, and 0 is loaded into its LSB. The MSB is shifted out and dropped. At the same time, BS 44 shifts to the left in latch 71, i.e. toward the MSB, to extract the value of the next i-bit. Step 93 then checks whether the sequence of steps 83, 85, 87 or 88, 89 and 91 has been performed n times. If not, the operation returns to step 83. If n sequences have been performed, the multiplication product resides in register 75 as value P.

The above-described implementation of the MULi instruction utilizes BS 44 which is part of the CPU. The invention exploits the fact, as explained above, that the MULi instruction requires only the n least significant bits of the result, and there is no need for overflow detection.

Figure 6:
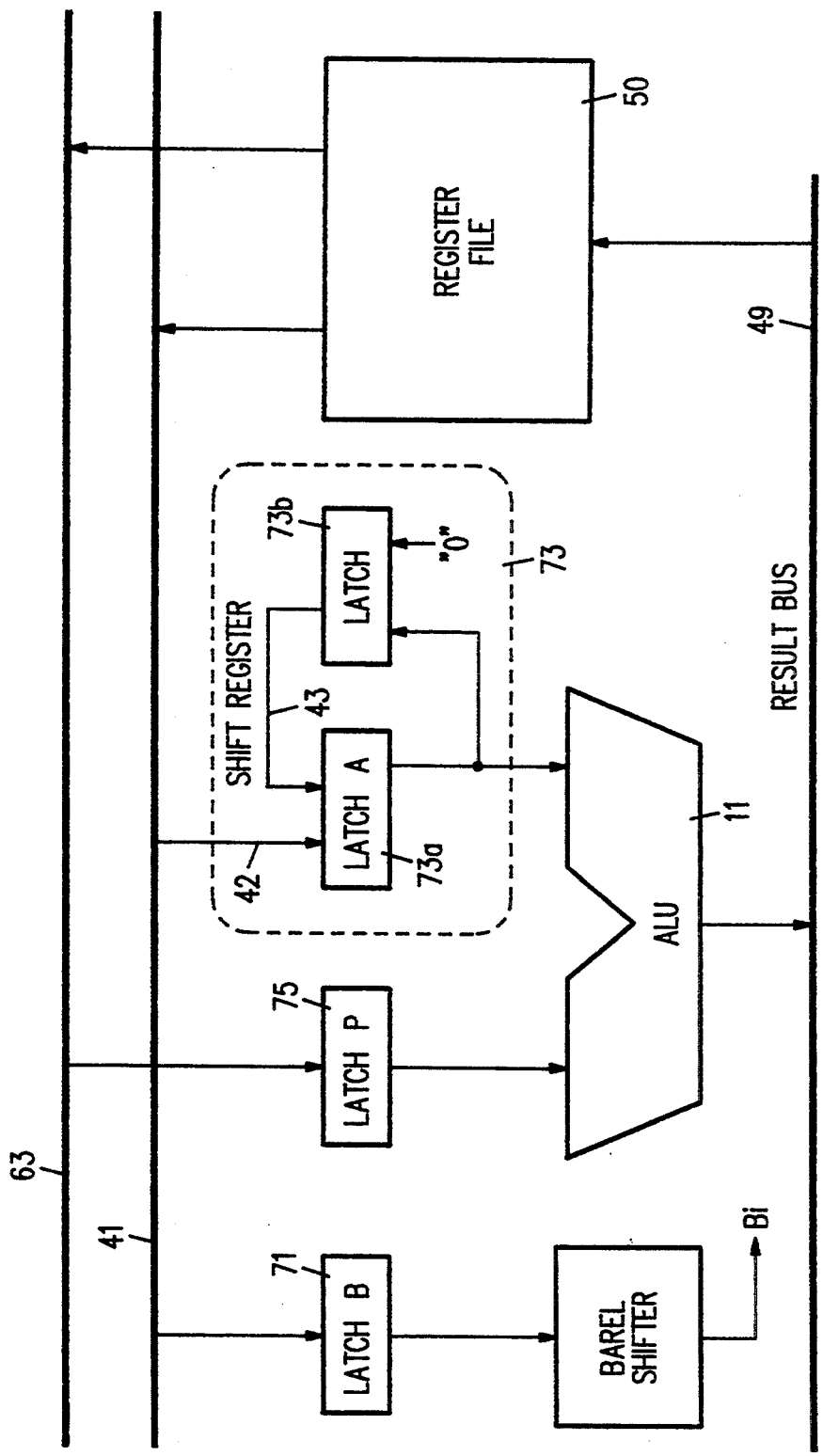
FIG. 6 is a schematic block diagram of a portion of the CPU shown in FIG. 3 to which modifications have been made to carry out the invention.

FIG. 6 shows how the MULi algorithm of the present invention is implemented with the CPU. Only those portions of the CPU of FIG. 3 directly necessary for the invention are shown in FIG. 6. The two-phase methodology used for the CPU described in U.S. Ser. No. 07/989,217 mentioned above requires latches at the inputs of the ALU 11 and BS 44. Latch 71 for storing operand B is the input latch of ALU 11. Latch 75 is one of the input latches of ALU 11. Element 73 would normally be just another of the input latches of ALU 11. ALU 11 needs only a simple latch 73 to implement logic functions and all arithmetic functions other than MULi. However, in order to implement the invention, element 73 is modified to include registers 73a and 73b which operate as follows.

Register 73a is a latch with input lines 42 and 43. Operand A is loaded into latch 73a over bus 41 and input lines 42. Input lines 42 are n lines providing latch 73a with the data from bus 41 in parallel. The lower 31 bits of latch 73a are connected to the upper 31 bits of register 73b which is also a latch. The latch 73b receives a "0" at its LSB. The output of latch 73b is provided to latch 73a over lines 43 which, like lines 42, provide this data in parallel. Thus, each time data from latch 73b is inputted to latch 73a, including the "0" assigned to the LSB of latch 73b, the contents of latch 73a are effectively shifted to the left (i.e. toward the MSB).

Operand P is stored in a temporary register of register file 50. Such a temporary register is normally a part of the register file 50 for use in LOAD execution and for calculating vector addresses during execution of an interrupt. A temporary register holds temporary (e.g. partial) results only during the execution process of a CPU and is not part of the programming model (i.e. it is not visible to the software but only to the hardware designer). For each sequence of steps, as described above, the value of P is read from the temporary register (during PHI1) into latch 75. P is added to A received from register 73, and the new value of P is written back into the temporary register via result bus 49.

This implementation of the CPU, which requires only the minor modification involving shift register 73, implements the MULi instruction with a throughput of one bit per cycle.

Although the above-provided description of the invention sets forth specific details thereof, various modifications thereto are readily apparent to one with ordinary skill in the art. For example, the ALU can be replaced by other arithmetic and/or logic apparatus. Also, if the implementation for a particular CPU does not require use of a latch in the input to the ALU and/or the BS, then operands P and B can be fetched in each cycle directly from the register file. In addition, if a temporary register is not available in the register file, the updated value of P outputted by ALU 11 can be stored instead in the destination register in the register file. However, in such a case, the data stored in the destination register is erased at the beginning of the operation. The impact on the CPU of such a change is as follows. Usage of the temporary register allows suspension of the multiply execution process before its completion without destroying the source operands.

This feature can reduce the response to interrupts (i.e. interrupt latency) significantly. This is not possible if the temporary register is not available.

These and all other such modifications are intended to fall within the scope of the present invention as defined by the following claims.

We claim:

1. A binary multiplier in a central processing unit (CPU) for integers that accepts two n-bit operands to provide an n-bit product after completion of n operational steps, comprising:
   an adder for adding two n-bit integer operands to produce a partial product, wherein the bits range from a least significant bit (LSB) to a most significant bit (MSB);
   designating means which for each of the n-operational steps designates a bit from the n-bits of one of said operands, and including a barrel shifter which operates as part of the CPU for multiplication as well as non-multiplication operations;
   first storing means for storing said partial product;
   second storing means for storing the other one of said operands and which, in each of the n-operational steps, shifts such operand one bit to the left while loading a "0" in the LSB and discarding the MSB;
   said adder having inputs coupled to outputs of said first storing means and said second storing means; and
   control means for carrying out each of said n operational steps by actuating the designating means to shift said bit designation from the LSB to MSB in a one bit increment, and to add the partial product to contents of said second storing means if the designated bit has a predetermined value;
   wherein said adder, said first storing means and said second storing means handle only n bits for each of said n operational steps.

2. The binary multiplier of claim 1, wherein said second storing means is initialized to a value of zero when a multiplication operation begins.

3. The binary multiplier of claim 1, wherein said predetermined value of said designated bit is a "1".

4. A computer implemented method of multiplying two n-bit operands to provide an n-bit product after completion of n operational steps, comprising the steps of:
   adding two n-bit integer operands to produce a partial product wherein the n-bits range from a least significant bit (LSB) to a most significant bit (MSB);
   designating a bit from the n-bits of one of said operands for each of the n operational steps by actuating operation of a barrel shifter, which operates as part of the computer for multiplication as well as non-multiplication operations;
   storing said partial product;
   storing the other one of said operands and, in each of the n operational steps, shifting said bit designation of the stored other one of said operands one bit to the left while loading a "0" in the LSB and discarding the MSB; and
   controlling each of said n operational steps by performing the designating step to shift from the LSB to MSB in a one bit increment, and adding the partial product to the shifted other operand if the designated bit has a predetermined value;
   wherein said adding, storing of the partial product and storing of the other operand steps handle only n bits for each of the n operational steps.

5. The method of claim 4, wherein said predetermined value of said designated bit is a "1".

6. The method of claim 4, wherein said stored partial product is initialized to a value of zero when a multiplication operation begins.

* * * * *